United States Patent [19]

Ban

[11] Patent Number: 4,562,976
[45] Date of Patent: Jan. 7, 1986

[54] ARM ROLLER SUPPORTING DEVICE FOR A SPINNING REEL

[75] Inventor: Masuo Ban, Sakai, Japan

[73] Assignee: Shimano Industrial Company Limited, Osaka, Japan

[21] Appl. No.: 503,734

[22] Filed: Jun. 13, 1983

[30] Foreign Application Priority Data

Jun. 22, 1982 [JP] Japan ................................. 57-94084

[51] Int. Cl.⁴ ............................................. A01K 89/00
[52] U.S. Cl. ............................... 242/84.2 G; 254/416; 384/206; 384/417
[58] Field of Search ................... 242/84.2 G, 84.21 R, 242/84.2 F; 384/417, 206; 254/415, 413, 416

[56] References Cited

U.S. PATENT DOCUMENTS

| | | | |
|---|---|---|---|
| 618,607 | 1/1899 | Murray | 384/417 |
| 640,009 | 12/1899 | Mittinger, Jr. | 384/417 |
| 1,136,847 | 4/1915 | Thornton | 384/417 |
| 2,349,084 | 5/1944 | Findley | 254/415 |
| 3,342,442 | 9/1967 | Brantingson | 242/84.2 G |
| 3,670,984 | 6/1972 | Lemery | 242/84.2 G |

FOREIGN PATENT DOCUMENTS 498460  1/1939  United Kingdom ............. 242/84.26

Primary Examiner—Stuart S. Levy
Assistant Examiner—Katherine Jaekel
Attorney, Agent, or Firm—Stevens, Davis, Miller & Mosher

[57] ABSTRACT

A supporting device which supports an arm roller to an arm cam at a spinning reel, the arm roller being supported rotatably to the arm cam in relation of being subjected to a load acting on the arm roller slantwise with respect to the axis of rotation thereof.

4 Claims, 7 Drawing Figures

ARM ROLLER SUPPORTING DEVICE FOR A SPINNING REEL

FIELD OF THE INVENTION

This invention relates to a supporting device for supporting an arm roller to an arm cam at a spinning reel.

The spinning reel described herein is provided with a rotary frame rotatably driven by a drive mechanism including a handle, the rotary frame having a pair of support arms. One support arm swingably supports an arm cam supporting an arm roller, and a bail arm is mounted across the arm cam and the other support arm so that the rotary frame rotates to wind onto a stationary spool a fishing line while being held and guided by the arm roller.

BACKGROUND OF THE INVENTION

Generally, the arm roller is supported rotatably to the arm cam and its conventional construction is shown in FIG. 7, in which a support S integral with a center pin C having a threaded shaft T is fixed to an arm cam A by use of a nut N screwed with threaded shaft T, the center pin C carrying therearound an arm roller R having at the center a pin insertion bore H.

In this construction, however, the arm roller R, when subjected to a tensile force P from the line guided by the same, will cause a frictional force F which is given by the equation:

$$F = P \times \mu,$$

where $\mu$ is a friction factor between the arm roller R and the center pin C. the friction force F increases in proportion to the intensity of tensile force P, thereby creating a problem in that the increasing friction force F will hinder smnooth rotation of arm roller R.

In other words, in the conventional reel construction as described above, the tensile force by the line acts on the center pin C perpendicularly to the center line thereof through the arm roller R. As a result, the frictional force F caused between the arm roller R and the center pin C applies a resistance against the rotation of arm roller R and increases as the tensile force P increases, thereby hindering smooth rotation of arm roller R.

SUMMARY OF THE INVENTION

An object of the invention is to provide an arm roller supporting device, by which the frictional force F is restricted from increasing in proportion to an increase of tensile force P, thereby allowing the arm roller to always smoothly rotate.

This invention is so constructed that a support means for rotatably supporting the arm roller is provided at an arm cam at a spinning reel and a contact means in contact with the support means to transmit thereto a load acting on the arm roller is provided thereon so that a support device for supporting the arm roller rotatably to the arm cam is formed, the contact means contacting with the support means at the contact portion where the contacting direction is slantwise with respect to the axis of rotation of the arm roller.

When an angle of inclination at the contact portion is represented by $\theta$, the tensile force of the line acting on the arm roller by P, and the friction factor at the contact portion by $\mu$, the arm roller is adapted to be subjected to the frictional force F given by the following equation:

$$F = P\mu \cos\theta.$$

Accordingly, when the tensile force P and friction factor $\mu$ are equal to those at the conventional example in FIG. 7, the frictional force F can be reduced as compared with the conventional reel since the frictional force does not increase in direct proportion to an increase of the tensile force P, but instead increases by P cos $\theta$, thereby enabling smooth rotation of the arm roller even when the tensile force P increases.

The support means of the invention mainly uses a pair of center pins mounted coaxially on the arm cam and supports the arm roller between the opposite ends of center pins, so that the receiving surfaces formed at the opposite ends or the contact surfaces at the arm roller to contact with the receiving surfaces respectively, are made conical or spherical to make the arm roller movable slantwise to the common axis of each center pin, thereby automatically adjusting the axis rotation of arm roller to prevent "a twist" of the fishing line.

Usually, the fishing line, when wound onto the spool at the spinning reel, is not always guided by the arm roller perpendicularly to the axis of center pin, but, in some case, the line of action of the load on the arm roller is slanted with respect to the axis of the center pin in condition of the fishing line wound onto the spool, resulting in that the arm roller tends to move slantwise to the axis of center pin.

In this case, the conventional construction shown in FIG. 7 supports the arm roller to the center pin through the pin insertion bore so that the arm roller is not movable slantwise to the center pin to thereby cause a twist of the fishing line guided by the arm roller. On the contrary, the arm roller of the invention constructed as the abovementioned is movable slantwise to the common axis to the center pins corresponding to the direction of the load on the fishing line, thereby automatically adjusting the axis of rotation of the arm roller perpendicularly to the line of action of the load.

Then, the twist in the fishing line occurring in the conventional example can be prevented.

The above and further objects and novel features of the invention will be more apparent from the following detailed description when the same is read in connection with the accompanying drawings.

BRIEF DESCRIPITON OF THE DRAWINGS

FIG. 1 is a side view of a spinning reel applied with an arm roller supporting device of the invention, FIG. 2 is a sectional view of an embodiment of the arm roller supporting device of the invention, FIG. 3 is a sectional view taken on the line III—III in FIG. 2, FIG. 4 is a sectional view of a modified embodiment of the invention, FIG. 5 is a view of explanation of operation of the FIG. 4 embodiment, FIG. 6 is a sectional view of another modified embodiment of the invention, and FIG. 7 is a sectional view of a support construction of a conventional arm roller.

DETAILED DESCRIPTION

Figure 1:
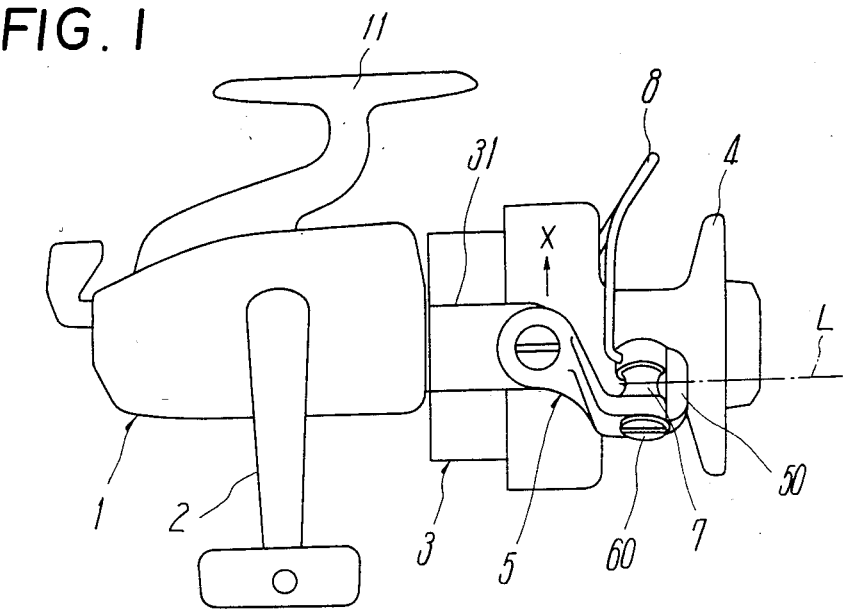

The arm roller supporting device of the invention support an arm roller to an arm cam at the spinning reel which is shown in outline in FIG. 1.

The spinning reel is of well-known construction, in which a reel body 1 has a reel mounting leg 11 integral therewith and rotatably supports a handle shaft (not shown) provided with an operating handle 2 and a tubular shaft (not shown) fixedly supporting a rotary frame 3 having a pair of support arms 31, the tubular shaft being connected in association with the handle shaft to rotate the rotary frame 3. A spool shaft (not shown) having a spool 4 is fitted into the tubular shaft in relation of being movable in reciprocation and is connected to the handle shaft in association therewith through a reciprocation movement change-over mechanism. One support arm 31 swingably supports an arm cam 5 which supports at the free end thereof an arm roller 7 through an arm roller supporting portion 50 and a bail arm 8 is provided across the other support arm (not shown) and the arm roller supporting portion 50, so that the arm cam 5 swings to change-over the bail arm 8 between the fishing line releasing and winding positions.

The handle 2 is rotated to allow the spool 4 to axially reciprocate and the rotary frame 3 to rotate in the direction of the arrow X in FIG. 1, whereby the fishing line L is guided by the arm roller 7 to be wound on the spool 4.

In the spinning reel constructed as described above, the supporting device of the invention supports the arm roller 7 rotatably to the arm cam 5 basically in relation of putting a load on the arm roller 7 slantwise with respect to the axis of rotation thereof.

In detail, the arm cam 5 is provided with a support means 6 and the arm roller 7 is provided with a contact means to contact with the support means 6 and to transmit thereto a load acting on the arm roller 7, so that the contact means contacts with the support means 6 at the portion where the contacting direction is slantwise with respect to the axis of rotation of arm roller 7.

Figure 2:
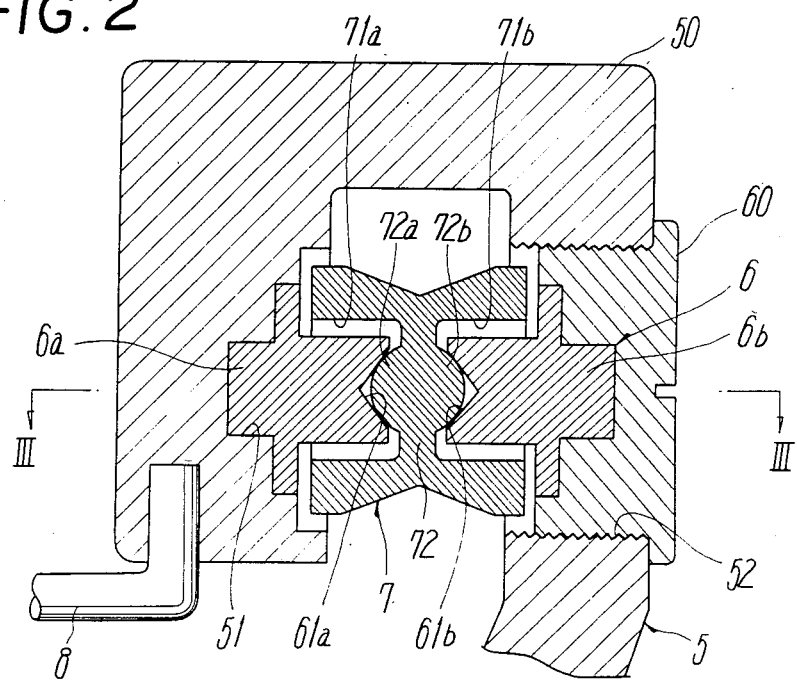
Figure 3:
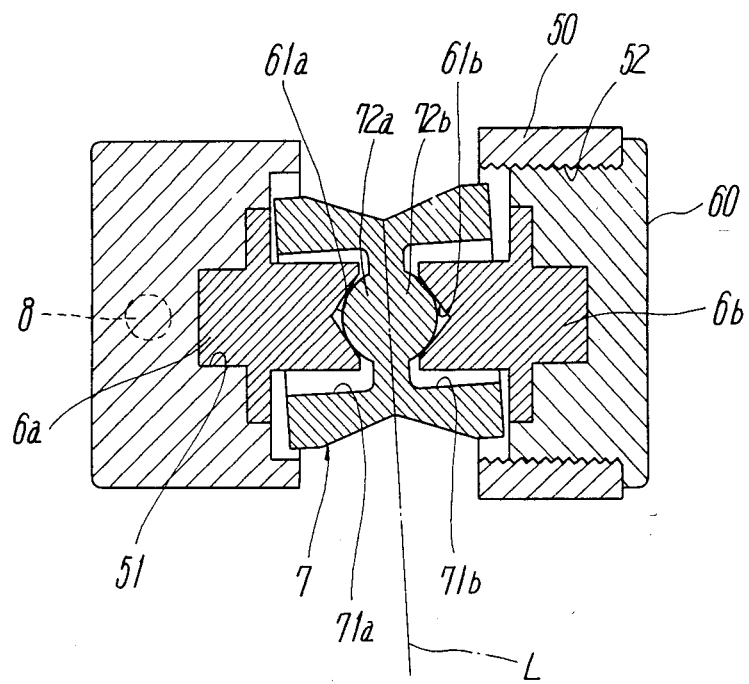

The embodiment shown in FIGS. 2 and 3 uses a pair of center pins 6a and 6b as the support means 6.

In detail, the arm cam 5 is provided at the free end thereof with the arm roller supporting portion 50 of an inversed-U like shape and integral with the same, one of the opposite walls at the supporting portion 50 having at the inside surface a fitting groove 51 and the other having a threaded bore 52.

The center pins 6a and 6b are disposed coaxially with each other, one center pin 6a being fitted non-rotatably into the groove 51 and the other 6b fixed to a screw member 60. Also, the center pins 6a and 6b are provided at the end faces opposite to each other with conical receiving faces 61a and 61b recessed axially at the center of the end faces respectively.

At the central portions of both axial end faces of arm roller 7 are formed pin receiving bores 71a and 71b which are open axially outwardly and large enough to receive the center pins 6a and 6b freely rotatably respectively and between the bores 71a and 71b is provided a central support 72 having concentrical, spherical swollen portions 72a and 72b in contact with the receiving faces 61a and 61b respectively.

The arm roller 7 is interposed between the opposite walls at the supporting portion 50, one swollen portion 72a at the arm roller 7 abuts against the receiving face 61a at one center pins 6a, and then the screw member 60 screws with the threaded bore 52, so that the other swollen portion 72b is received by the receiving face 61b at the other center pins 6b, thereby supporting the arm roller 7 rotatably by the center pins 6a and 6b.

Accordingly, the swollen portions 72a and 72b of arm roller 7 contact with the receiving faces 61a and 61b of center pins 6a and 6b at the positions where the contacting directions are slantwise with respect to the axis of rotation of arm roller 7 to thereby transmit the load thereon to the center pins 6a and 6b in slantwise condition. As a result, when and angle of inclination at each receiving face 61a or 61b with respect to each center pins 6a or 6b is represented by $\theta$, a tensile force from the fishing line L by P, and a friction factor at the respective contact portions by $\mu$, a frictional force F is given by the following equation:

$$F = P\mu \cos\theta.$$

Therefore, the arm roller 7, even when the tensile force P increases, is smoothly rotatable.

Moreover, in a case where, for example, the fishing line L yet in a small amount is wound onto the spool 4 and guided by the arm roller 7 slantwise to the common axis to center pins 6a and 6b so that the line of action of the load on the arm roller 7 is slanted to the common axis, the arm roller 7, as shown in FIG. 3, moves slantwise at the predetermined angle with respect to the common axis to center pins 6a and 6b, thereby automatically adjusting the axis of arm roller 7 always perpendicular to the line of action of the tensile force from the fishing line L. Hence, no unbalanced load is applied to the arm roller 7 and no twist is caused in the line L.

Alternatively, the receiving faces 61a and 61b may be spherically recessed and the swollen portions 72a and 72b be conical respectively.

Figure 4:
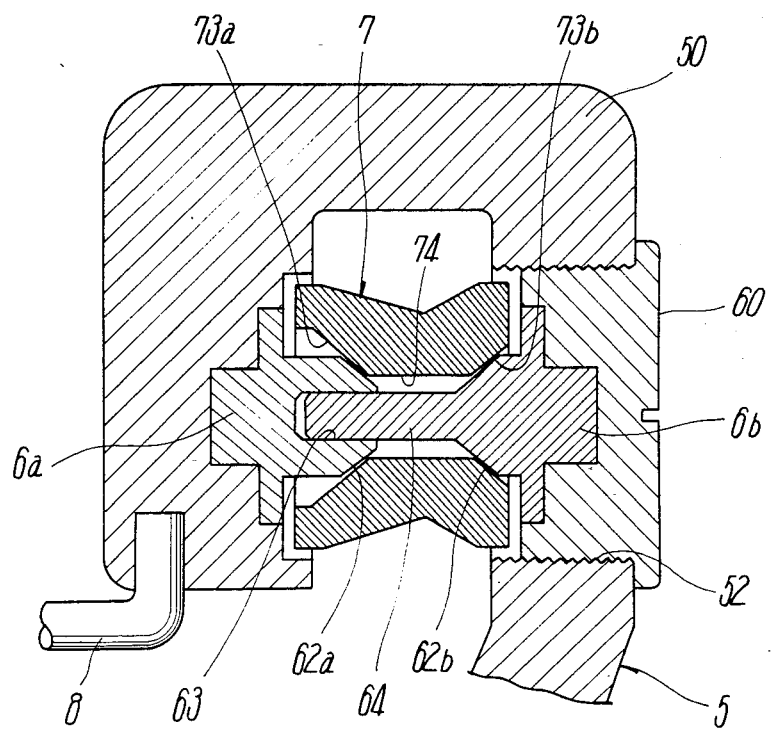

Referring to FIG. 4, a modified embodiment of the invention is shown, which is provided at the outer peripheries of center pins 6a and 6b with receiving faces 62a and 62b each slanted at the predetermined angle to the axial direction of each center pin 6a or 6b, one center pin 6a having at the utmost end thereof an insertion groove 63 extending axially of the center pin 6a, and the other center pin 6b having a connector 64 to be fitted into the groove 63.

At both axial end faces of arm roller 7 and formed conical recesses 73a and 73b which communicate with each other through a through bore 74 extending axially of arm roller 7. The arm roller 7 is interposed between the opposite walls at the supporting portion 50, the screw member 60 screws with the threaded bore 52 at the supporting portion 50, and simultaneously the connector 64 at the center pin 6b fixed to the screw member 60 is fitted into the groove 63 through the through bore 74, thereby connecting the center pins 6a and 6b. Thus, the receiving faces 62a and 62b at the center pins 6a and 6b, as shown in FIG. 4, bear the inner peripheries of groove 73a and 73b respectively, thereby supporting the arm roller 7 rotatably to the center pins 6a and 6b.

Therefore, both the center pins 6a and 6b can be aligned with each other simply by inserting the connector 64 into the groove 63 as shown in FIG. 4, thereby enabling smooth rotation or arm roller 7 the same as in the embodiment shown in FIGS. 2 and 3.

Next, explanation will be given on the operation of arm roller 7 in FIG. 4 in accordance with the illustration of FIG. 5.

The tensile force P, when generated on the fishing line L guided by the arm roller 7 to be wound onto the spool 4, acts on the arm roller 7 to lead to generation of a reaction force of P/2 at the inner periphery of the respective grooves 73a and 73b.

Figure 5:
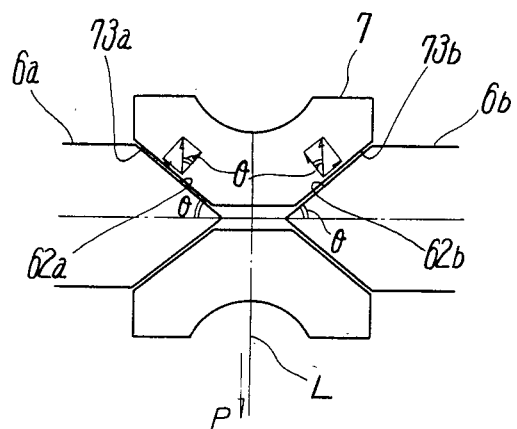
Figure 7:
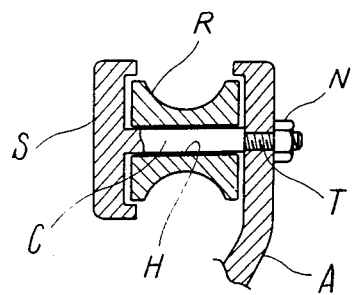

In a case where an angle of inclination of each receiving face 62a or 62b at each center pin 6a or 6b is represented by $\theta$, and a friction factor between the inner periphery of the respective grooves 73a and 73b and the respective receiving faces 62a and 62b by $\mu$, a frictional force F generated on the arm roller 7 is given by $$\left(\frac{P}{2}\cos\theta\right) \times \mu \times 2$$

and becomes smaller than the frictional force $F=P\times\mu$ in the conventional arm roller shown in FIG. 7, thereby allowing the arm roller 7 shown in FIGS. 4 and 5 also to rotate more smoothly than a conventional one.

Figure 6:
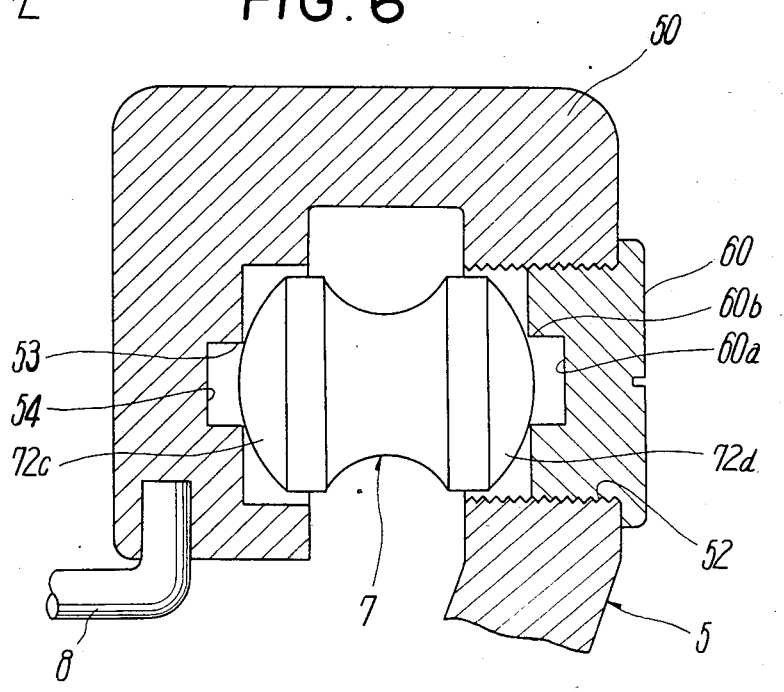

Alternatively, the support means 6, as shown in FIG. 6, may not use the center pins 6a and 6b.

In FIG. 6, the arm roller 7 is provided at both axial ends with spherial swollen portions 72c and 72d concentric with each other, a groove 54 having a annular receiving portion 53 is formed at the inner surface of one of opposite walls at the support portion 50, and a groove 60a having an annular receiving portion 60b is formed at the end face of screw member 60, so that the receiving portions 53 and 60b support the swollen portions 72c and 72d at the arm roller 7.

As seen from the above, the arm roller supporting device of the invention can make the frictional force on the arm roller smaller than that on the conventional one to thereby enable smooth rotation of the arm roller and light operation of the handle for winding the fishing line.

Although several embodiments have been described, they are merely exemplary of the invention and not to be constructed as limiting, the invention being defined solely by the appended claims.

What is claimed is:

1. A supporting device which supports an arm roller to an arm cam at a spinning reel comprising:
    a support means at said arm cam of said reel for rotatably supporting said arm roller, said support means having an inverted U-like-shape and at one of two opposing walls a fitting groove and at the other of said opposing walls a threaded bore;
    a center pin mechanism having one end fitted nonrotatably into said fitting groove and another end fitted to a screw member screwed with said threaded bore, said center pin mechanism having spaced apart outer conical shaped supporting faces slanted with respect to the axis of said center pin mechanism, said arm roller having at opposite axial ends recesses containing conical inner surfaces respectively engaging with the conical shaped supporting faces of said center pin mechanism to transmit to said support means a load acting on said arm roller, so that said arm roller contacts with said support means at a contact portion where the contacting direction is slantwise with respect to the axis of rotation of said arm roller.

2. A supporting device according to claim 1, wherein said center pin mechanism comprises a pair of engaging center pins, one of which is fitted non-rotatably into said fitting groove, the other of which is fitted to said screw member.

3. A supporting device according to claim 2, wherein one of said center pins has at the center thereof an insertion groove and the other of said center pins has a connector fitted into said insertion groove.

4. A supporting device as in claim 1, wherein said arm roller further includes a central bore interconnecting said recesses.

* * * * *